Patented Oct. 30, 1928.

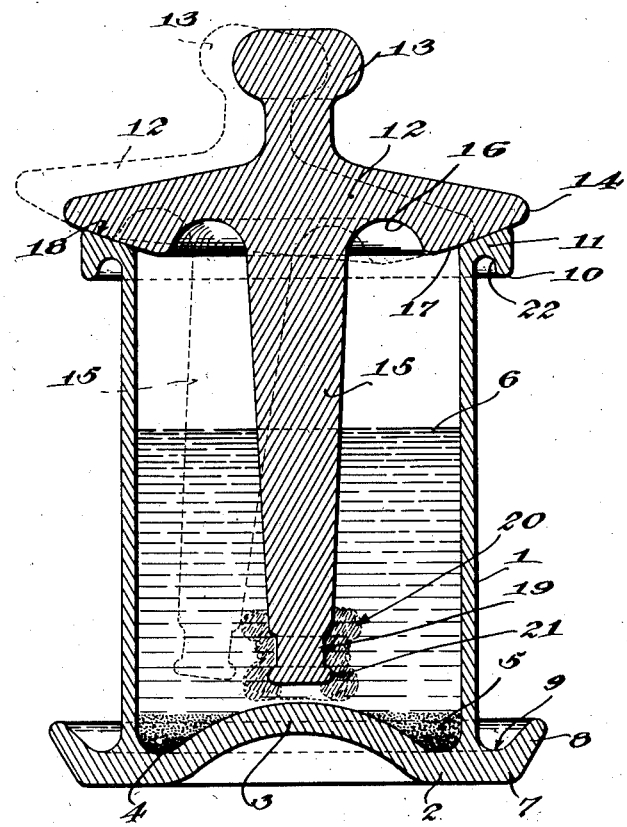

1,690,035

UNITED STATES PATENT OFFICE.

AUGUSTINE G. O'NEILL AND CLARENCE M. JONES, OF TULSA, OKLAHOMA.

LIQUID CONTAINER.

Application filed February 16, 1927. Serial No. 168,776.

Our invention relates to improvements in liquid containers, and it consists in the combinations, constructions, and arrangements herein described and claimed.

An object of our invention is the provision of a container which not only is simple in construction and artistic in design but which affords facilities for the storage and handling of liquids which ordinarily are used in cooking, such as oils, fats, and greases, in a convenient, clean, efficient and sanitary manner.

A further object of the invention is the provision of a liquid container of the character described that is constructed in such manner that liquids may be placed therein and removed therefrom without any liquid dripping or falling onto a supporting or adjacent object or onto the hand of the user of the device.

A further object of the invention is the provision in a liquid container of the character described of a hollow body adapted for the reception of the liquid and formed so that any sediment in the liquid will be collected and retained at the bottom of the retainer body.

A further object of the invention is the provision in a container of the character described of a hollow body having an integral trough around the bottom portion of the body for the reception of drippings from the lid of the container or from any higher portion of the container body.

A further object of the invention is the provision of a container comprising a hollow body and a lid therefor, the upper edge surface of the body and the lower face of the marginal portion of the lid being curved along arcs of the same circle so that the lid will have a dust-proof contact with the container body in any possible body-covering position on the upper edge of the container body and will remain in any such position on the upper edge of the container body.

A still further object of the invention is the provision in a container of the character described which also serves as a shield for an integral handle on the lid, as a support for an integral pendent stem for agitating the liquid within the associated container body and for carrying an absorbent member for removing liquid from the container body and applying it to a heated griddle, frying pan, or like article, and also when inverted as a drip reservoir for a considerable quantity of liquid which subsequently may be caused to flow along the aforesaid stem onto the liquid or grease applicator.

Another object of the invention is to provide a construction of stem lid and handle, which when set inverted on a flat surface, that is, in vertical position, will remain vertically balanced on the flat top of the handle.

Another object of the invention is to provide such balance of the stem-lid and handle unit so that when said unit is laid on its side, that is, when the lid edge is in contact with a flat surface, the handle will over-balance the stem and lift up said stem so that no liquid or grease will be spilled from such member when member is removed from liquid container vessel and deposited elsewhere.

Another object of the invention is to provide a construction of the stem-lid-handle unit so that it may be used as a pouring rod, that is, that the stem may be held by the handle against the lip of a vessel containing a liquid to be poured, so as to insure proper directional pouring of the liquid.

Other objects and advantages of the invention will be apparent from the following description, considered in conjunction with the accompanying drawing, in which the figure is a vertical section through the improved container, showing in dotted lines the position to which the lid and the integral pendent stem thereon can be moved from the full line position of such parts without any interruption of the seal between the lid and the container body.

The improved container comprises a hollow body which may be made of glass, porcelain, earthenware, metal, or any other suitable material. The aforesaid body comprises an upright hollow portion 1 which is open at its upper end and is closed at its lower end by an integral bottom 2. The bottom 2 is raised or arched centrally at 3 so as to present a convexly curved surface within the container body, thus providing an annular trough or channel 4 within the lower part of the container body into which sediment will gravitate, as at 5, from liquid 6 that has been placed within the container body.

The bottom 2 of the container body is formed with an integral outwardly extending flange 7 which has an upwardly and outwardly inclined marginal edge portion 8, thus producing a circular trough 9 which surrounds the lower portion of the container body and into which liquid may flow from the outer wall of the upstanding portion 1 of the container body or drip from a pendent circular drip lid 10 at the outer edge of an integral outwardly extending flange 11 on the upper edge portion of the upstanding part 1 of the container body.

A lid 12 for the container body preferably is made of the same material as the container body, although it may be made of any suitable material. The lid 12 is formed with an integral upstanding central knob-like handle 13 from which the remainder of the upper surface of the lid slopes to the marginal edge of the lid. The marginal edge portion of the lid 12 is rounded off vertically as indicated at 14 and is of slightly greater diameter than the diameter of the flange 11 at the upper end of the container body but of less diameter than the upwardly and outwardly inclined edge portion 8 of the flange 7 at the bottom of the container body. Any liquid which might in any manner be deposited on the sloping upper face of the lid 12 probably will drain therefrom onto the outer edge of the flange 11 and thence from the dip lip 10 into the drip receiving trough 9. However, should the liquid on the lid 12 be sufficient to cause such liquid to fall direct from the outer edge of the lid, such liquid will be caught in the drip receiving trough 9.

The lid 12 is formed with an integral central downwardly tapering rod-like extension or stem 15 which will depend within the upright portion 1 of the container body nearly to the highest part of the raised central portion 3 of the bottom of the container body when the lid rests on the flanged upper edge of the container body. The lid 12 has a circular recess 16 in its normally lower face around the portion of the stem 15 that is joined integrally to the lid 12, said recess being concavely curved in cross section and serving as a drain trough when the lid 12 is inverted for a purpose to be presently described. The portion of the normally lower face of the lid 12 that extends from the outer edge of the circular recess 16 to the outer edge of the lid and the upper surface of the flanged upper edge portion of the container body are curved transversely along arcs of the same circle as indicated at 17 and 18, respectively, the portion 17 of the lower face of the lid 12 being convexly curved transversely thereof, whereby a dust-proof seal will be produced between the lid and the upper edge portion of the container body when any part of the portion 17 of the lower face of the lid rests on any part of the upper surface 18 of the flanged upper edge portion of the container body. In other words, the lid 12 may be oscillated or rocked between the full line position and the dotted line position of the figure of the drawing for the purpose of agitating the liquid within the container body through the agency of the pendent member 15 without breaking the dust-proof seal between the container lid and the body. Also such dust-proof seal will be produced between the lid and the container body when the lid has been placed in any position on the container body with a portion of the surface 17 on the under side of the lid in contact with the surface 18 of the flanged upper edge portion of the container body and will remain in any such position. The width of the portion 17 of the under face of the lid is considerably greater than the width of the surface 18 on the flanged upper edge portion of the container body so that a considerable oscillatory or rotary movement of the stem 15 in the container body is possible without interruption of the seal between the lid and the flanged upper edge portion of the container body. The lower end portion of the stem 15 is formed with an annular groove 19 of considerable width for the partial reception of any annular liquid holding or absorbent member 20, such as convolutions of yarn, thread, cord, fabric, or a brush, a bead 21 thus being produced at the free end of the stem 15 for preventing the member 20 from slipping from the end of the stem 15.

From the foregoing description of the various parts of the device, the operation thereof may be readily understood. The container is intended particularly for use for holding fats, greases, oils, and other liquids for use in cooking operations. The flange 11 at the upper end of the container body serves as a stop for the hand in which the upright portion 1 of the container body is grasped should the outer surface of the upright portion 1 of the container body be slippery because of the presence of grease thereon. When liquid is placed in the container body, any liquid that is deposited on the downwardly and inwardly sloping surface 18 of the flanged upper edge portion of the container body will drain therefrom into the container body and any liquid that may flow down the outer edge of the flange 11 will drip from the lip 10 into the trough 9 which surrounds the lower portion of the container body and thus will not fall onto the surface on which container body rests or onto any adjacent object. The lid 12 may be manipulated by means of the handle 13 on the container body to agitate the liquid within the container body above the raised central portion 3 of the bottom of the liquid container without agitating the sediment within the trough 4 in the lower part of the container body and the stem 15 also carries the absorbent member 20 whereby liquid may be removed from the container body and applied to a hot griddle, frying pan, or like utensil or object. This may be done by lifting the lid bodily from the container body and inverting it quickly so that the liquid that drains from the member 20 will fall into the trough 16 or flow down the stem 15 into the trough 16. Then, when it is desired to apply the liquid to the griddle, pan, or like utensil, the lid is manipulated so as to serve as a shield between the hand of the user and the heated pan or like utensil so that any liquid in the trough 16 will flow therefrom along the stem onto the applicator 20, thus assuring a substantial supply of liquid on the applicator 20 when it is used for greasing a griddle, frying pan, or like utensil or object. When the lid is returned to its place on the flanged upper edge of the container body, any liquid that may drain from the lid outwardly of the flanged upper edge of the container body will flow downwardly onto the lip 10 and then drip into the trough 9 and it will be noted at this point that an annular space is provided at 22 between the lip 10 and the outer wall of the upright portion 1 of the container body so that the upright portion 1 of the container body is not likely to get wet by liquid from the container by liquid passing thereto from the drip lip 10. Therefore, the outer wall of the upright portion 1 of the con-container body will remain dry and adapted to be gripped firmly in the hand or hands of a user of the device, even though the use of the device in the manner hereinbefore described has resulted in liquid draining from the outer edge portion of the lid onto the flange 11 at the upper end of the container body. All extending edge portions and all exterior and interior surfaces are rounded off or arcuately curved so as to permit convenient and thorough cleaning thereof.

The top of the handle 13 constitutes a flat surface of substantial extent, so that the stem-lid-handle unit may be inverted on a flat surface so that the top surface of the handle rests thereon and provides a firm base. The handle is made heavier than the stem so that when the stem-lid-handle unit is laid on a flat surface with the lid edge 14 in contact with such surface, the tendency will be for the handle to overbalance the stem and lift the stem up and out of contact, with the surface that the unit may be resting upon.

It will be manifest that from the foregoing description our improved container possess many beneficial features. The container is simple in construction and also is attractive in appearance.

Obviously, the invention is susceptible of embodiment in forms other than that which is illustrated in the accompanying drawing and we therefore consider as our own all such modifications and adaptations thereof as fairly fall within the scope of the appended claims.

We claim:—

1. A container of the character described comprising an upright hollow portion having a bottom, said bottom having an outwardly extending continuous marginal flange formed with its outer edge portion inclined upwardly and outwardly, thus producing an external trough, said upright hollow portion of the container having an external flange at its upper end formed with a depending continuous lip at its outer edge, said lip being located directly above the external trough at the lower end of the upright portion of said container.

2. A container of the character described comprising an upright hollow portion having a bottom, said bottom having an outwardly extending continuous marginal flange formed with its outer edge portion inclined upwardly and outwardly, thus producing an external trough, said upright hollow portion of the container having an external flange at its upper end formed with a depending continuous lip at its outer edge, said lip being located directly above the external trough at the lower end of the upright portion of said container, and being spaced from the adjacent wall of the upright portion of the container by a continuous groove, said groove being concavely curved in cross sectional configuration.

3. A container of the character described comprising an upright hollow portion having a bottom, said bottom having an outwardly extending continuous marginal flange formed with its outer edge portion inclined upwardly and outwardly, thus producing an external trough, said upright hollow portion of the container having an external flange at its upper end formed with a depending continuous lip at its outer edge, said lip being located directly above the external trough at the lower end of the upright portion of said container, and a lid for covering the upper end of said upright portion of the container, said lid extending beyond the flange at the upper end of the upright portion of the container and terminating inwardly of the outer edge of the flange at the lower end of said upright portion of the container.

4. A container of the character described comprising an upright hollow portion having a bottom, said bottom having an outwardly extending continuous marginal flange formed with its outer edge portion inclined upwardly and outwardly, thus producing an external trough, said upright hollow portion of the container having an external flange at its upper end formed with a depending continuous lip at its outer edge, said lip being located directly above the external trough at the lower end of the upright portion of said container, and a lid for covering the upper end of said upright portion of the container, said lid extending beyond the flange at the upper end of the upright portion of the container and terminating inwardly of the outer edge of the flange at the lower end of said upright portion of the container, the outer edge of said lid being rounded off transversely thereof.

5. A container having a body comprising an upright hollow portion closed at its lower end and a lid for covering the upper end of said upright portion of the container body, the lower face of the outer portion of said lid and the upper edge of the upright portion of the container body being arcuately curved to complement each other, the arcuately curved lower face of the outer portion of the lid being convexly curved and of greater width than the arcuately curved upper edge of the upright portion of the container body.

6. A container having a body comprising an upright hollow portion closed at its lower end and a lid for covering the upper end of said upright portion of the container body, the lower face of the outer portion of said lid and the upper edge of the upright portion of the container body being arcuately curved to complement each other, the arcuately curved lower face of the outer portion of the lid being convexly curved and of greater width than the arcuately curved upper edge of the upright portion of the container body, said lid having a central depending stem adapted to extend nearly to the bottom of the upright portion of the container body and having a continuous trough in its lower face surrounding said stem, said stem being adapted when the lid is oscillated on the upper edge of the upright portion of the container body to agitate the liquid within said upright portion of the container body.

7. A container having a body comprising an upright hollow portion closed at its lower end and a lid for covering the upper end of said upright portion of the container body, the lower face of the outer portion of said lid and the upper edge of the upright portion of the container body being arcuately curved to complement each other, the arcuately curved lower face of the outer portion of the lid being convexly curved and of greater width than the arcuately curved upper edge of the upright portion of the container body, said lid having a central depending stem adapted to extend nearly to the bottom of the upright portion of the container body and having a continuous trough in its lower face surrounding said stem, said stem being adapted when the lid is oscillated on the upper edge of the upright portion of the container body to agitate the liquid within said upright portion of the container body, said trough in the lower face of the lid being concavely curved in transverse configuration.

8. A container having a body comprising an upright hollow portion closed at its lower end and a lid for covering the upper end of said upright portion of the container body, the lower face of the outer portion of said lid and the upper edge of the upright portion of the container body being arcuately curved to complement each other, the arcuately curved lower face of the outer portion of the lid being convexly curved and of greater width than the arcuately curved upper edge of the upright portion of the container body, said lid having a central depending stem adapted to extend nearly to the bottom of the upright portion of the container body and having a continuous trough in its lower face surrounding said stem, said stem being adapted when the lid is oscillated on the upper edge of the upright portion of the container body to agitate the liquid within said upright portion of the container body, said stem tapering toward its lower end and having a reduced portion adjacent to its lower end, thus producing a bead at the lower end of the stem, and means engaged with the reduced lower end portion of the stem for removing liquid from the container and for applying said liquid to a heated pan or like object.

9. A container having a body comprising an upright hollow portion closed at its lower end and a lid for covering the upper end of said upright portion of the container body, the lower face of the outer portion of said lid and the upper edge of the upright portion of the container body being arcuately curved to complement each other, the arcuately curved lower face of the outer portion of the lid being convexly curved and of greater width than the arcuately curved upper edge of the upright portion of the container body, said lid having a central depending stem adapted to extend nearly to the bottom of the upright portion of the container body and having a continuous trough in its lower face surrounding said stem, said stem being adapted when the lid is oscillated on the upper edge of the upright portion of the container body to agitate the liquid within said upright portion of the container body, said stem tapering toward its lower end and having a reduced portion adjacent to its lower end, thus producing a bead at the lower end of the stem, and means engaged with the reduced lower end portion of the stem for removing liquid from the container and for applying said liquid to a heated pan or like object, and a handle upstanding on said lid opposite to said stem, whereby said lid also is adapted to serve as a shield for the hand against heat when the free end of the stem is moved in proximity to a heated pan or like source of heat.

10. A container having a body comprising an upright hollow portion closed at its lower end and a lid covering the upper end of said upright portion of the container body, the lower face of the outer portion of said lid and the upper edge of the upright portion of the container body being arcuately curved to complement each other, the arcuately curved lower face of the outer portion of the lid being convexly curved and of greater width than the arcuately curved upper edge of the upright portion of the container body, said lid having a central depending stem adapted to extend nearly to the bottom of the upright portion of the container body and having a continuous trough in its lower face surrounding said stem, said stem being adapted when the lid is oscillated on the upper edge of the upright portion of the container body to agitate the liquid within said upright portion of the container body, said stem tapering toward the lower end and having a reduced portion adjacent to its lower end, thus producing a bead at the lower end of the stem, and means engaged with the reduced lower end portion of the stem for removing liquid from the container and for applying said liquid to a heated pan or like object, said liquid applicator comprising an absorbent member embracing the reduced lower end portion of said stem.

11. A container having a body comprising an upright hollow portion closed at its lower end and a lid for covering the upper end of said upright portion of the container body, the lower face of the outer portion of said lid and the upper edge of the upright portion of the container body being arcuately curved to complement each other, the arcuately curved lower face of the outer portion of the lid being convexly curved and of greater width than the arcuately curved upper edge of the upright portion of the container body, said lid having a central depending stem adapted to extend nearly to the bottom of the upright portion of the container body and having a continuous trough in its lower face surrounding said stem, said stem being adapted when the lid is oscillated on the upper edge of the upright portion of the container body to agitate the liquid within said upright portion of the container body, said stem tapering toward the lower end and having a reduced portion adjacent to its lower end, thus producing a bead at the lower end of the stem, and means engaged with the reduced lower end portion of the stem for removing liquid from the container and for applying said liquid to a heated pan or like object, said liquid applicator comprising an abosrbent member embracing the reduced lower end portion of said stem, said trough in the lower face of the lid constituting a drip-receiving trough when the lid is inverted from which liquid will drain along the stem to said liquid applicator when the lid is again placed substantially in upright position.

12. A container comprising a body having an upright hollow portion closed at its lower end and having an external drip-receiving trough at its lower end, and a lid for closing the upper end of said upright portion of the container body, said lid having an upstanding central handle leaving a flat top of substantial area and sloping from said handle toward its edge, the edge of said lid terminating inwardly of the outer edge of said drip-receiving trough, a stem dependent from the central part of said lid, said stem being lighter in weight than said handle whereby said handle will tend to overbalance said stem when the edge of said lid is the fulcrum.

AUGUSTINE G. O'NEILL.
CLARENCE M. JONES.